United States Patent [19]
McCarty et al.

[11] Patent Number: 6,110,051
[45] Date of Patent: Aug. 29, 2000

[54] BILLIARD CUE

[75] Inventors: Allan McCarty; Steve Titus, both of Jacksonville, Fla.

[73] Assignee: Lorraine C. McCarty Trust, Royal Oak, Mich.

[21] Appl. No.: 09/200,244

[22] Filed: Nov. 25, 1998

Related U.S. Application Data

[60] Provisional application No. 60/066,895, Nov. 25, 1997.

[51] Int. Cl.$^7$ .................................................. A63D 15/08
[52] U.S. Cl. ................................................................ 473/44
[58] Field of Search ................................... 473/44–49, 61

[56] References Cited

U.S. PATENT DOCUMENTS

| 4,816,203 | 3/1989 | Son-Kung | 473/44 |
| 5,112,046 | 5/1992 | Thorpe | 473/47 |

FOREIGN PATENT DOCUMENTS

| 726578 | 1/1966 | Canada | 473/44 |
| 2060411 | 5/1981 | United Kingdom | 47/44 |
| 2187646 | 9/1987 | United Kingdom | 473/44 |
| 2199505 | 7/1988 | United Kingdom | 473/51 |

*Primary Examiner*—Mark S. Graham
*Attorney, Agent, or Firm*—Young & Basile

[57] ABSTRACT

A billiard cue includes a shaft having a hollow bore extending from at least a predetermined distance from a first end toward a second end. The bore forms an outer wall in the shaft having a thickness between about 0.03 and 0.05 inches. The shaft is preferably formed of a composite material consisting of fibers in a binder, such as carbon fibers in an epoxy resin. The shaft material has a modulus of elasticity of at least $4.3 \times 10^6$ psi. The bore extending from the first end of the shaft, the thin wall thickness of the shaft adjacent to the first end and the material forming the shaft combine to decrease the mass of the tip end of the shaft while maintaining substantially all of the stiffness of a conventional shaft formed of a hard maple to minimize buckling of the tip end of the shaft and thereby substantially decrease deflection of the cue ball from its intended path of movement along a path parallel to the stroke axis of the shaft.

9 Claims, 3 Drawing Sheets

BILLIARD CUE

CROSS-REFERENCE TO CO-PENDING APPLICATION

This application claims the benefit of the filing date of provisional application Ser. No. 60/066,895 filed Nov. 25, 1997 in the name of Allan McCarty and Steve Titus and entitled "Billiard Cue", the contents of which are incorporated herein in its entirety.

BACKGROUND OF THE INVENTION

1. Field of the Invention

The present invention relates, in general, to billiard cues and, more specifically, to billiard cue shafts.

2. Description of the Art

Billiard or pool cues typically are formed of an elongated shaft; a butt at one end of the shaft and a ferrule mounted at an opposite end which supports a tip. The shaft may be formed as a solid, one-piece member or of two threadingly engageable sections. Typically, the shaft has been formed of a hard wood, such as a hard maple.

Other materials, such as aluminum, steel, plastic and carbon fiber, have also used to form billiard/pool cue shafts. Cues formed of such "non-wood" materials have been engineered to approximate wood in weight and stiffness or rigidity; however none have proven to play better than a hard wood cue.

It is also known to form cue shafts of solid maple with a thin composite outer skin formed of various fibers and/or resin combinations. It is known to form a cue shaft of a solid glass bonded fiber as shown in U.S. Pat. No. 3,103,359. It is also known to form a cue shaft as a composite tube of carbon fibers in which the shaft has a wall thickness of 0.060 inches or more and the hollow interior of the shaft is filled with foam as shown in U.S. Pat. No. 4,816,203. U.S. Pat. No. 5,112,046 discloses a shaft formed of a solid epoxy resin body with a central graphite core. This shaft accommodates flexure and impact by utilizing elongated carbon filaments circumferentially spaced apart and concentrically disposed about the core and extending axially through the front and rear sections of the shaft.

Generally a billiard or pool cue is formed with one of two styles of taper. In an "American" taper, the cue has a constant diameter of approximately 0.5 inches for approximately the first twelve inches from the tip end, this being the longest bridge length commonly used in play. The other common type of taper is a so-called "European taper". In this style of cue, the cue has a truncated cone shape along its entire length tapering to a tip.

Previously devised ferrules have been formed of ivory which is substantially harder than that of the material used to form the shaft. More recently, reinforced phenolics and thermoplastics have been employed to form ferrules. Such ferrules have a modulus of elasticity ranging from a high of $1.3 \times 10^6$ psi to a low of $0.35 \times 10^6$ psi as compared to the $1.8 \times 10^6$ psi modulus of elasticity of hard maple commonly used to form the shaft. The ferrule is adhesively joined to and/or press fit to one end of the shaft, typically by means of a tenon in the form of a narrow diameter end portion which projects out of the end of the shaft into a hollow bore extending inward from one end of the ferrule or, alternately, from the ferrule into a bore in one end of the shaft.

The tip, which is typically formed of leather, is adhesively joined to the ferrule. Generally, the tip, according to popular practice, is formed with a large radius to present a generally flat ball contacting end portion.

In use, the shaft is lined up with the intended path of movement of the cue ball prior to stroking the shaft to impact the tip on the ball. The cue can also be lined up to strike the cue ball off center, that is, to the left or right of the center of the ball, or above or below the center of the ball, to impart spin, draw or follow to the cue ball to cause it to move in a desired direction after it strikes another ball or a rail. However, as a result of a hit to the left or right of center, the cue ball does not follow a path of movement that is parallel to the line of stroke of the cue. Rather, the cue ball deflects or moves in a path at an angle to the line of stroke of the cue. This so-called angle of deflection varies with the speed of the stroke and how far from center the cue tip strikes the cue ball, but with a given off center distance and speed, the magnitude of the angle of deflection is primarily a function of the cue itself.

During off center hits, the tip, ferrule and the end of the shaft up to the player's hand bridge initially buckles due to loading of the impact forces 7 generated during impact of the tip with cue ball on an inside edge of the shaft closest to the center of the ball. This buckling is then followed by an outward flexing of the tip, ferrule and shaft end. Experimentation by the Applicants has shown that a large amount of buckling results in a larger and more undesirable deflection of the cue ball from a path of movement parallel to the cue stroke line than when buckling is minimized and the end of the cue more easily flexes or bends outward from the center of the cue ball after impact with the cue ball. Applicants have also found that a substantial amount of the cue ball deflection is due to the mass of the shaft at the tip end of the shaft.

In order to address the cue ball deflection problem, the Applicants devised a billiard/pool cue disclosed in U.S. Pat. No. 5,725,437 and in co-pending application Ser. No. 08/825,240, filed Mar. 27, 1997 in the names of Allan McCarty and Steve Titus and entitled "Billiard/Pool Cue". In both of these disclosures, a hollow bore is formed in the shaft extending from the first end for a predetermined distance toward the second or butt end. The bore forms a hollow cavity in the shaft after the ferrule is mounted on the first end of the shaft. The purpose of the bore is to reduce the weight of the tip end thereby resulting in a lighter tip end which is capable of easier outward flexing than previously devices cue shafts since the tip end can quickly accelerate laterally due to its reduced weight. However, the shaft of the cue disclosed in this patent and pending application is made of wood thereby necessitating large wall thicknesses for strength. This large thickness counteracts the reduced weight in the tip end of the shaft formed by the bore.

Thus, it would be desirable to provide a billiard cue which has a significantly reduced mass at the tip end of the shaft while maintaining sufficient stiffness to minimize flexure or buckling of the tip end of the shaft and thereby deflection of a ball struck by the cue. It would also be desirable to provide a billiard cue formed of a material having high strength and stiffness; while at the same time providing a light weight and low mass to at least the tip end of the shaft. It would also be desirable to provide a billiard cue formed of a material having a unique combination of stiffness and lightweight to enable the tip of the cue to be displaced on impact with a ball while still remaining in contact with the ball as the ball begins to rotate.

SUMMARY OF THE INVENTION

The present invention is a billiard cue which significantly reduces cue ball deflection by significantly reducing the mass and/or weight of at least the tip end of the shaft while maintaining the shaft stiffness equal to or greater than the stiffness of a comparable shaft formed of solid maple.

In a preferred embodiment, the billiard cue includes a shaft having a wall with an outer surface and first and second ends. A hollow bore extends from the first end for at least a predetermined distance along the length of the shaft toward the second end. The shaft has a wall thickness of about 0.030 to 0.050 inches between the opposed ends of the bore. The shaft is formed of fibers in a binder.

Preferably, the wall thickness of the shaft along the bore is less than or equal to 0.04 inches. More preferably, the wall thickness is about 0.03 inches from the first end of the shaft to an intermediate point along the length of the bore in the shaft. The intermediate point is exemplary located at about 5 to about 15 inches from the first end of the shaft.

The shaft is, by example, formed of carbon fibers disposed in an epoxy resin. Further, the shaft is formed of a material having a modulus of elasticity about or greater than $4.3 \times 10^6$ psi.

The billiard cue of the present invention is constructed to provide a significantly reduced mass at the tip end of the shaft; while maintaining the stiffness of the shaft equal to or greater than a conventional shaft made of hard maple. The reduced mass is achieved by forming a hollow bore in the shaft extending for at least a predetermined distance from the first end of the shaft and a thin wall thickness at the first end of the shaft. This lower mass at the tip end of the shaft and high stiffness reduces flexure or buckling of the tip end of the cue shaft when the shaft is impacted with a ball thereby significantly reducing the deflection of the struck ball from its intended path of movement generally parallel to the stroke axis of the cue shaft. However, the unique combination of stiffness and lightweight characteristics maintains the cue tip on the ball while allowing deflection of the tip as the ball begins to rotate.

BRIEF DESCRIPTION OF THE DRAWING

The various features, advantages and other uses of the present invention will become more apparent by referring to the following detailed description and drawing in which.

DESCRIPTION OF THE PREFERRED EMBODIMENTS

Figure 1:
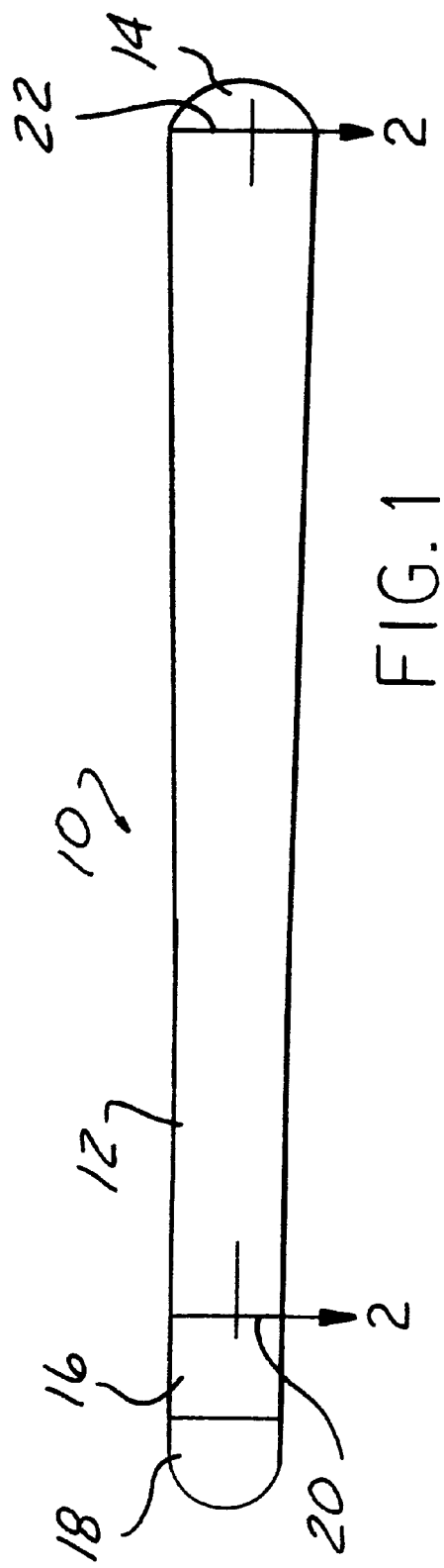
FIG. 1 is a side elevational view of a billiard cue constructed in accordance of the teachings of the present invention.
Figure 2:
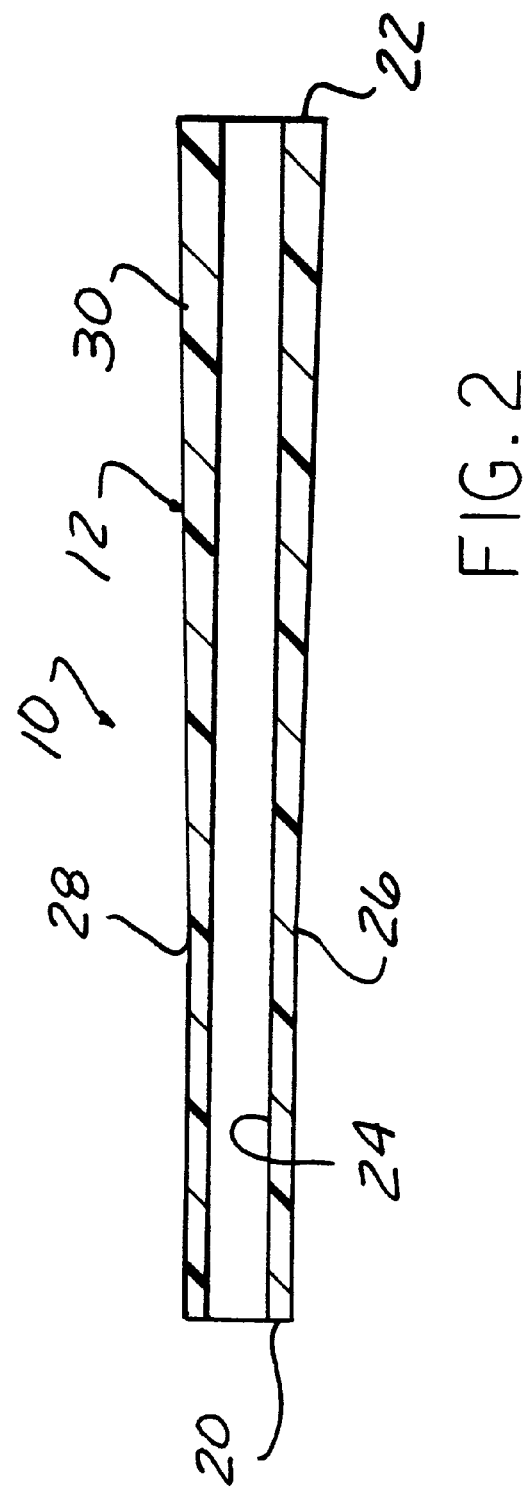
FIG. 2 is an enlarged, cross-sectional view generally taken along line 2—2 in FIG. 1.

Referring now to the drawing, and to FIGS. 1 and 2 in particular, there is depicted a billiard/pool cue 10 constructed in accordance with the teachings of the present invention. The cue 10 has a unique shaft which has reduced mass at the tip end to lessen buckling of the tip end of the shaft which results in a truer tracking of the ball along its intended path of movement with less deflection.

Figure 3:
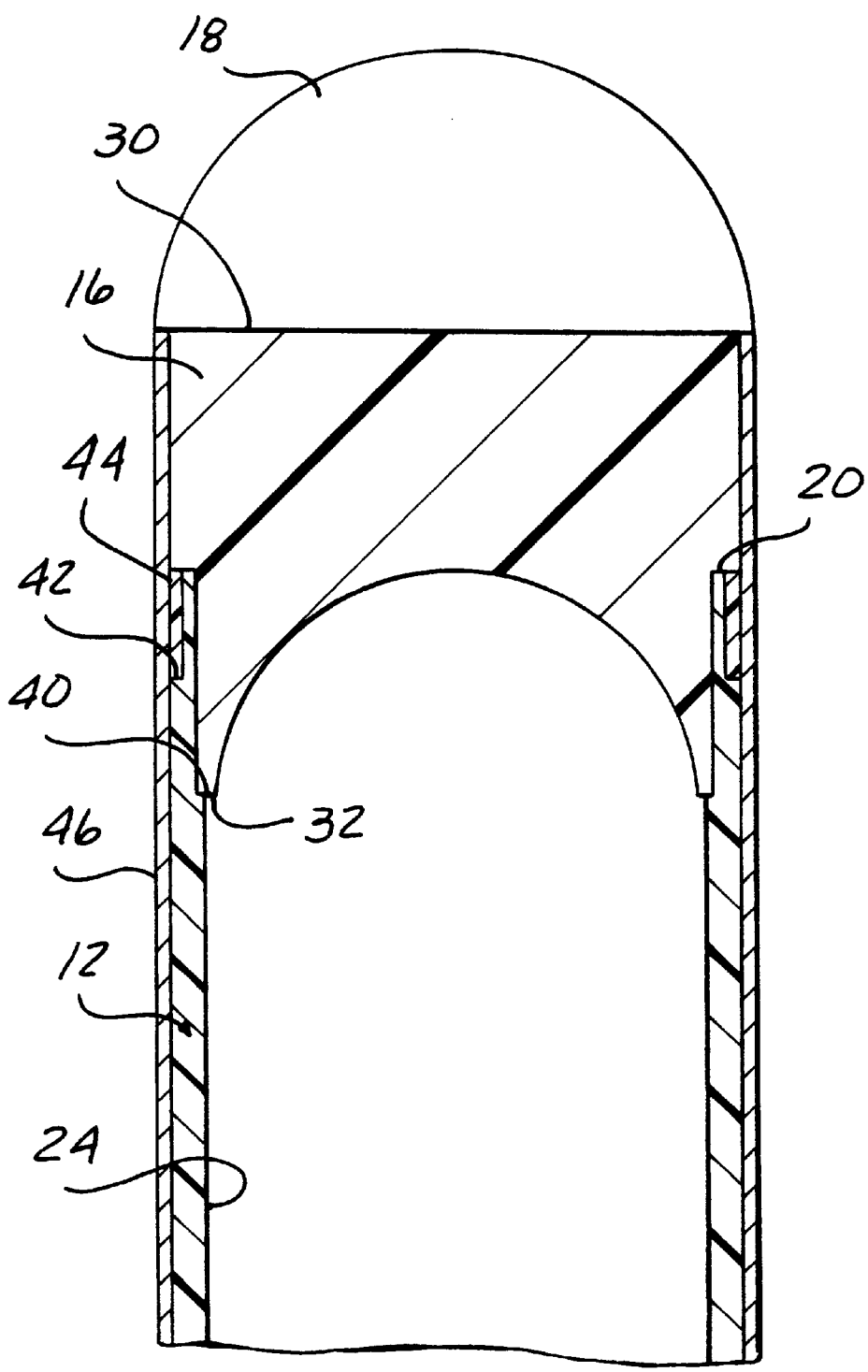
FIG. 3 is an enlarged cross-sectional view of the tip, ferrule and tip end of the shaft of the cue shown in FIG. 1.

As shown in FIGS. 1–3, the cue 10 includes a shaft 12, a butt end 14, a ferrule 16 and a tip 18. The shaft 12 may be formed of a single elongated member or two short members which are coaxially joined together.

The shaft 12 has a first end 20 on which the ferrule 16 is mounted, as described hereinafter and an opposed second end 22 to which the butt 14 is mounted in a conventional manner. A bore 24 extends through the shaft 12 at least for a predetermined distance, such as five to fifteen inches, from the first end 20 and, preferably, for the entire length of the shaft 12 between the first and second ends 20 and 22. Although an exterior surface 26 of the shaft 12 may be formed with either American or European tapers, the inner diameter or I.D. of the bore 24 can remain constant along its entire length. By way of example, the bore 24 has a exemplary inner diameter of about 0.440 inches.

In an exemplary "American taper" shaft 12, the wall thickness of the shaft 12 from the first end 22 to an intermediate point denoted by reference numeral 28 which is approximately 14–15 inches from the first end 20, is at a constant 0.030 inches. In the "American taper" the O.D. of the shaft 12 between the first end 20 and the intermediate point 28 also remains constant.

From the intermediate point 28 to the second end 22, the exterior surface 26 of the shaft 12 tapers outwardly in a smooth, concave shape to another point 30 spaced from the second end 22 wherein it makes a convex transition to a generally straight taper of approximately 0.015 inches per inch to the second end 22.

From the intermediate point 28 to the second end 22, the wall thickness of the shaft 12 increases to approximately 0.04 inches and more as the O.D. of the shaft 12 increases toward the second end 22.

The shaft 12 is preferably formed of a composite material, such as graphite epoxy or fiber reinforced plastics, which are typically many times stronger per unit weight than hard maple. For example, graphite or carbon fibers imbedded in an epoxy resin binder may have a modulus of elasticity of greater than $4.3 \times 10^6$ psi for a 0.5 inch O.D. tip end shaft and the above-described wall thickness of 0.030 to 0.040 inches. Generally, the graphite or carbon fibers, which may also include glass fibers, extend linearly along the length of the shaft 12 between the first and second ends 20 and 22. The density of the fibers changes the modulus elasticity of the shaft 12. Thus, in an exemplary embodiment, the shaft 12 is formed of linearly extending fibers and a binder having a modulus elasticity of at least as great as $4.3 \times 10^6$ psi and a thin wall thickness, at least at the tip end 20 of the shaft 12 of about 0.030 inches in diameter. Other binder materials, such as polyester, etc. may also be employed. Thus, glass fiber/epoxy or glass fiber/polyester composites may also be employed to form the shaft 12.

The shaft 12 formed of these materials and having the desired modulus of elasticity and the thin wall cross-section has specified above an 80% decrease in mass toward the tip end 20 of the shaft 12 as compared to a similar size maple cue. This, coupled with the radius of the tip 18 and the compressible material of the ferrule 16, as described in Applicants U.S. Pat. No. 5,725,437, the contents in which are incorporated herein by reference, decreases the peak force taken by the shaft 12 upon impact with a ball to lessen buckling of the tip end 20 of the shaft 12. The decreased mass at the tip end 20 of the shaft 12 decreases the lateral force transmitted to the cue ball due to the necessary lateral acceleration of the tip 20 of the shaft 12.

At the same time, the reduced mass and increased tip acceleration of the shaft 12 also preserves approximately 94% of the stiffness of the shaft. This minimizes flexure of the tip end 20 of the shaft 12 and decreases deflection of the cue ball from its intended path of movement.

For completeness, a brief description of ferrule 16 and tip 18 will be provided herein. However, further details concerning the construction of the ferrule 16 and the tip 18 may be found by referring to the above-referenced and incorporated co-pending application.

The ferrule 16, as shown in FIG. 3, has a generally cylindrical shape with either straight side walls or a slight taper between a first end 30 and a second end 32. The second end 32 may be generally planar or formed with a concave recess as shown by example only in FIG. 3. The ferrule 16 may be formed with a variety of materials, such as nylon, ABS, urethane, etc., as long as the ferrule 16 has greater compression in the longitudinal direction than the compressibility of a material used to form the shaft 12.

Various mounting arrangements may be employed to mount or attach the ferrule 16 to the first end 20 of the shaft 12. As shown in FIG. 3, in one exemplary mounting arrangement, an annular shoulder 40 is spaced from the first end 20 of the shaft 12 and receives a second end 32 of the ferrule 16. The side wall of the ferrule 16 is notched so as to seat against the first end 20 of the shaft 12.

The shaft 12 is further notched as shown by reference number 42 to form an annular recess extending from the first end 20. A support member 44, such as an annular band of radially extending glass or carbon fibers, is wrapped around the end of the shaft 12 in the recess to increase the strength of the ferrule 16 mount to fully retain the ferrule 16 in the shaft 12.

By way of example only, an optional outer coating of a wood, such as 0.005 inch maple veneer 46, is adhesively joined to the outer surface of the shaft 12.

The tip 18 is formed of a conventional material and is typically mounted by means of an adhesive to the first end 30 of the ferrule 16. Optionally, a resilient pad, not shown, may be interposed between the tip 18 and the first end 30 of the ferrule 16.

Figure 4A:
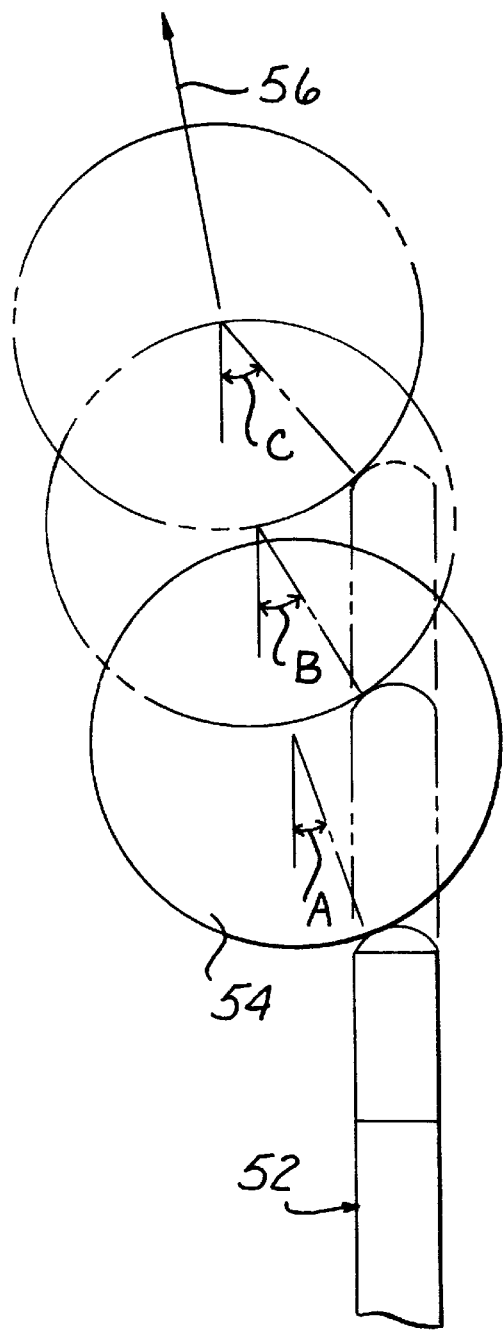
FIGS. 4A and 4B are pictorial representations depicting the impact of a conventional cue and the cue of the present invention with a ball.
Figure 4B:
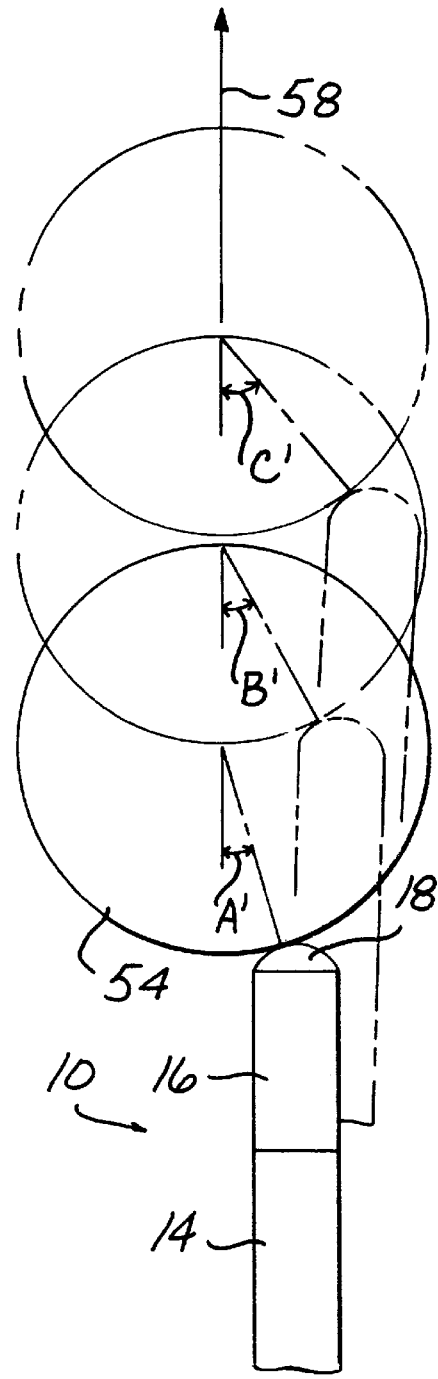

The advantages of the cue 10 of the present invention may be more clearly understood by reference to FIGS. 4A and 4B which respectively show the action of a conventional shaft 52 and a shaft 14, ferrule 16 and tip 18 of the present invention on impact with a ball 74. The conventional shaft 52, shown in FIG. 4A, is formed of hard maple. Impact forces generated during an off-center impact of the shaft 52 with a ball 54 causes the tip end of the shaft 52 to buckle inward along the inside edge of the shaft 52 pushing the shaft 52 laterally outward at increasingly larger angles A, B and C. This results in deflection of the ball 54 along path 56 which is not parallel to the stroke axis of the shaft 52.

FIG. 4B depicts the action of the tip end of the cue 10 of the present invention during impact with the ball 54. Due to the high stiffness and light weight of the tip end of the cue 10, deflection of the tip end of the shaft 12, as shown in FIG. 2B, is minimized. However, the cue 10 exhibits easy radially outward flexure, to the positions shown in phantom in FIG. 4B during impact with the ball 74, which results in less deflection of the ball 74 from a line parallel to the line of movement or stroke axis of the shaft 14. The successive angles A', B' and C' are smaller than the angles A, B, C, respectively, in FIG. 4A. The combination of light tip end weight and high stiffness enables the tip 18 of the cue 10 to remain in contact with the ball 54 without added deflection as the ball begins to rotate. As a result, the ball 54 travels along path 58 which is more closely aligned or parallel with the stroke axis of the cue 10.

In summary, there has been disclosed a unique billiard cue having a unique shaft construction which minimizes buckling of the tip end of the shaft and significantly reduces the amount of deflection of a cue ball struck by the shaft from an intended path of movement generally parallel to the longitudinal stroke axis of the shaft. The shaft is formed of a composite material constructed of fibers in a binder which has a modulus of elasticity greater than or equal to $4.3 \times 10^6$ psi. A hollow bore extends through the shaft at least for a predetermined distance, such as at least five to fifteen inches from the first end of the shaft, to form a thin outer wall in the shaft. The outer wall has a thickness of about 0.030 inches extending from the tip end to a transition point located intermediately along the shaft wherein the wall thickness increases to about 0.040 inches in a gradual taper extending toward the second end of the shaft.

What is claimed:

1. A billiard cue comprising:

a shaft having a wall with an outer surface and first and second ends, a hollow void bore extending from the first end for at least a predetermined distance along the length of the shaft toward the second end;

the shaft having a wall thickness of about 0.030 to 0.050 inches between opposed ends of the bore; and the shaft formed of fibers disposed in a binder.

2. The billiard cue of claim 1 wherein the wall thickness is less than or equal to 0.04 inches.

3. The billiard cue of claim 1 wherein the wall thickness is 0.03 inches from the first end of the shaft to an intermediate point along the length of the shaft.

4. The billiard cue of claim 3 wherein the intermediate point is located from about 5 to about 15 inches from the first end of the shaft.

5. The billiard cue of claim 1 wherein the fibers are carbon fibers disposed in an epoxy resin binder.

6. The billiard cue of claim 1 wherein the shaft is formed of a material having a modulus of elasticity greater than or equal to $4.3 \times 10^6$ psi.

7. The billiard cue of claim 6 wherein the modulus of elasticity of the shaft is about $4.3 \times 10^6$ psi.

8. A billiard cue comprising:

a shaft having a wall with an outer surface and first and second ends, a hollow void bore extending from the first end for at least a predetermined distance along the length of the shaft toward the second end;

a shaft having a wall thickness of about 0.030 inches along the bore; and the shaft formed of a material having a modulus of elasticity greater than or equal to $4.3 \times 10^6$ psi.

9. The billiard cue of claim 8 wherein the shaft is formed of carbon fibers disposed in an epoxy resin binder.

* * * * *

UNITED STATES PATENT AND TRADEMARK OFFICE
CERTIFICATE OF CORRECTION

| | |
|---|---|
| PATENT NO. | : 6,110,051 |
| APPLICATION NO. | : 09/200244 |
| DATED | : August 29, 2000 |
| INVENTOR(S) | : Allan McCarty and Steve Titus |

Page 1 of 1

It is certified that error appears in the above-identified patent and that said Letters Patent is hereby corrected as shown below:

<u>On the Title page at Related U.S. Application Data Item (60)</u>
Please delete paragraph at Item (60) "Provisional application No. 60/066,895, Nov. 25, 1997." and insert new paragraph --Provisional application No. 60/066,589, Nov. 26, 1997.--

Signed and Sealed this

Thirteenth Day of May, 2008

JON W. DUDAS
*Director of the United States Patent and Trademark Office*